Aug. 28, 1923.
J. P. HART
TIRE CHAIN ATTACHING DEVICE AND CARRIER
Filed Jan. 24, 1921    3 Sheets-Sheet 1
1,466,374
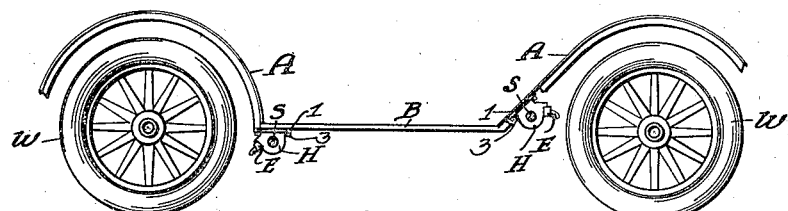
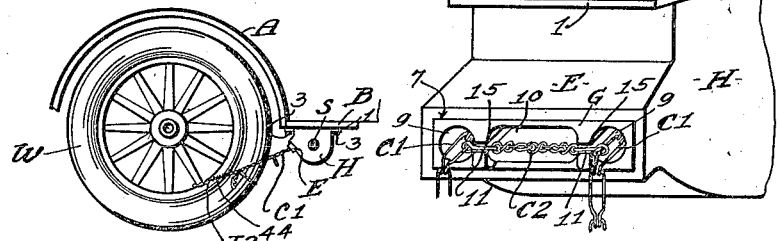
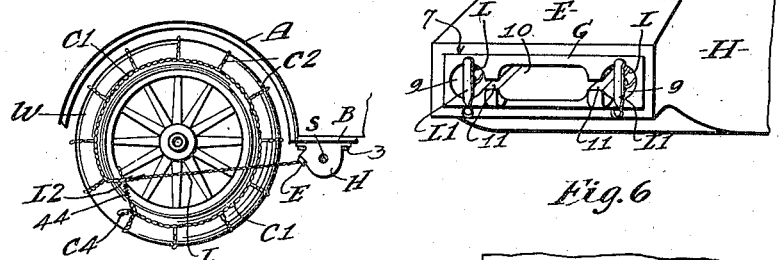
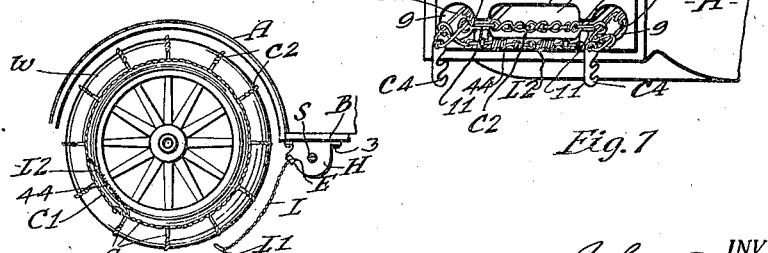
INVENTOR.
John P. Hart,
BY
ATTORNEYS.

Aug. 28, 1923.  
J. P. HART  
TIRE CHAIN ATTACHING DEVICE AND CARRIER  
Filed Jan. 24, 1921  
1,466,374  
3 Sheets-Sheet 2
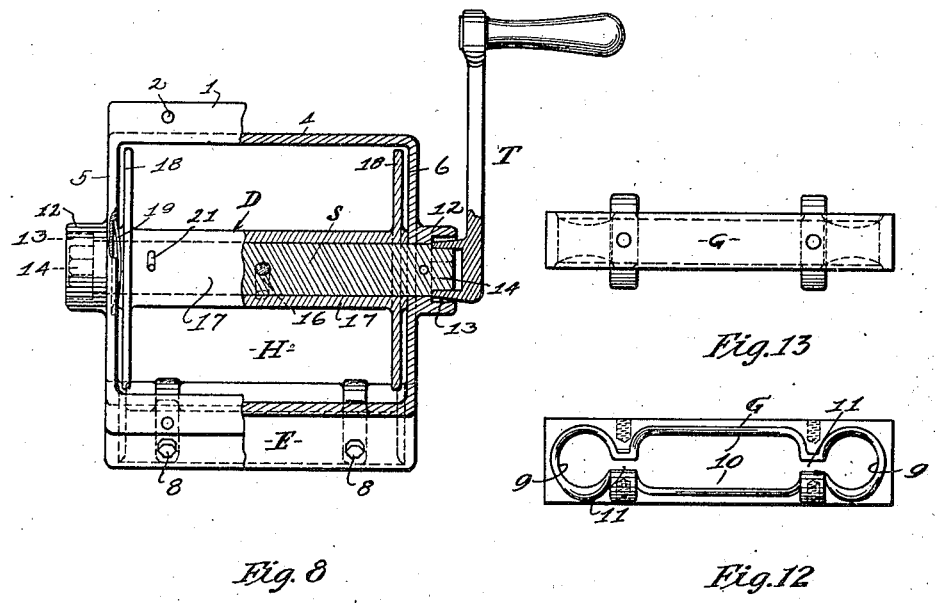
Fig. 8  
Fig. 13  
Fig. 12
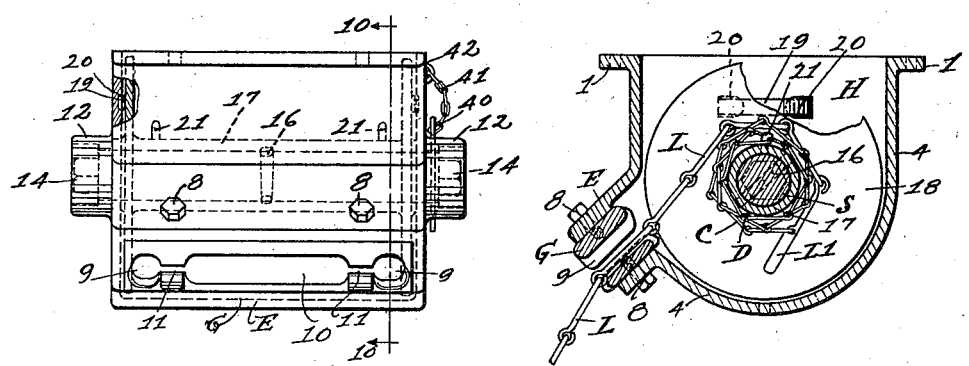
Fig. 9  
Fig. 10
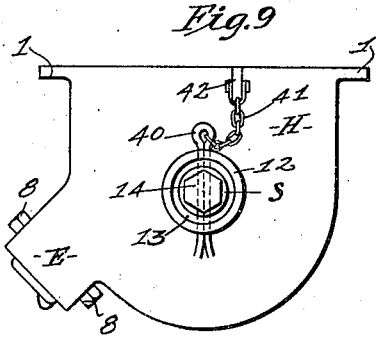
Fig. 11
INVENTOR.
John P. Hart,
BY
ATTORNEYS Aug. 28, 1923.

J. P. HART 1,466,374

TIRE CHAIN ATTACHING DEVICE AND CARRIER

Filed Jan. 24, 1921  3 Sheets-Sheet 3

INVENTOR.
John P. Hart,
BY
ATTORNEYS.

Patented Aug. 28, 1923.

1,466,374

UNITED STATES PATENT OFFICE.

JOHN P. HART, OF LOS ANGELES, CALIFORNIA.

TIRE-CHAIN-ATTACHING DEVICE AND CARRIER.

Application filed January 24, 1921. Serial No. 439,663.

*To all whom it may concern:*

Be it known that I, JOHN P. HART, a citizen of the United States, and a resident of Los Angeles in the county of Los Angeles and State of California, have invented new and useful Improvements in Tire-Chain-Attaching Devices and Carriers, of which the following is a specification.

My invention relates to means attached to the running gear frame or body of an automobile or motor vehicle, for supporting tire chains such as are used on pneumatic tires in rainy weather, whereby the chains may be at all times readily accessible for placement on the tires with facility and dispatch.

The main object of my invention therefore is to provide suitable carrier elements adapted to be attached at convenient points to the running board, fenders, frame or other portions of the body of an automobile or motor vehicle, and adapted to inclose the chains when the same are not in use, said devices being arranged for feeding the chains to the wheels of the car as the wheels are rotated so that they may be readily attached thereto for use.

It will be understood in this connection that the tire chains at the present time are placed on the tires by hand, after having been first removed from a suitable container and spread upon the ground and straightened out, whereupon the car is moved in one or the other direction on to the chains and the ends of the chains are hooked together around the tires. Or, as a substitute for this method for placing the chains on the tire, they are sometimes hung over the top of the tire and pulled together at their ends near the ground by first moving the wheels slightly.

In all cases however, manual effort is required for placing the tire chains on the tires and as this operation is always performed in wet weather, and frequently on muddy roads, the operation is a very undesirable one, and the operator of the car is subjected to the necessity of soiling his hands and clothes when it becomes necessary to use the chains. Frequently on this account, and because of the great amount of effort necessary to place the chains in position for use, and the consequent loss of time, the use of the chains is dispensed with and the objects for which the chains are provided is defeated.

It is therefore another object of my invention to provide means whereby the chains may be conveniently carried in position for use and attached to the tire with but little effort on the part of the operator, and in a minimum length of time.

A still further object is to provide in combination with the usual form of tire chains and a suitable housing therefor, of a mechanism within said housing, including lead chains attached to the front and rear ends of the usual tire chains for facilitating the attachment of the chain to, and the removal from, a tire.

A further object is to provide a suitable form of housing for the chains, provided with an extension having a restricted passage formed in a special and particular manner, so as to receive and hold the tire chains slightly apart laterally, and to prevent a twisting and entangling of the links of the chain, which ordinarily occurs when the chains are carried in other forms of receptacles such as bags and the like.

A still further object is to provide in a housing for holding chains of the character described, a guide member having spaced end passages and an enlarged central passage between which are provided restricted passages for receiving the end links of the cross chains, the longitudinal chains being carried in said end passages, and the central links of the cross chains being carried in said central passage so as to at all times hold the chains in readiness for use.

Another object is to provide means for automatically re-winding the chains when the same are detached from the tire, together with brake means to prevent excessive speed of the winding means. Other minor objects will appear as the description progresses.

I have shown three practical embodiments of my invention in the accompanying drawings, in which:

Fig. 1 is a fragmentary side elevation of an automobile showing my tire chain carriers, and attaching means supported thereon for use at convenient points, the chains being held within the carriers in inoperative position.

Fig. 2 is a fragmentary side elevation of a rear portion of the same, showing the first step in the chain attaching operation.

Fig. 3 is a similar view showing the chain completely encompassing the wheel in readiness for attaching the ends thereof together, and for detaching the attaching mechanism from the chain.

Fig. 4 is a similar view, showing the chain on the tire in readiness for use, with the inner lead chain of the attaching mechanism in position for restoration to position within the carrier.

Fig. 5 is a perspective view of one of the carrier housings, showing a fragment of the chain extended from the guide member thereof.

Fig. 6 is a fragmentary view of the same, showing the outer ends of the inner lead chain held against the mouth of the housing, when the chain is completely enclosed therein.

Fig. 7 is a similar view of the housing, showing the chain projection therefrom, with the connecting hooks and the lead chain suspended from the end of the housing.

Fig. 8 is a plan, partly in section, of the carrier, showing the mechanism containing the winding mechanism therein.

Fig. 9 is a side elevation of the same.

Fig. 10 is a sectional elevation of the same on line 10—10 of Fig. 9.

Fig. 11 is an end elevation of the housing.

Figs. 12 and 13 are side and plan views of the chain guide member held in the mouth of the housing.

Figures 14, 15:
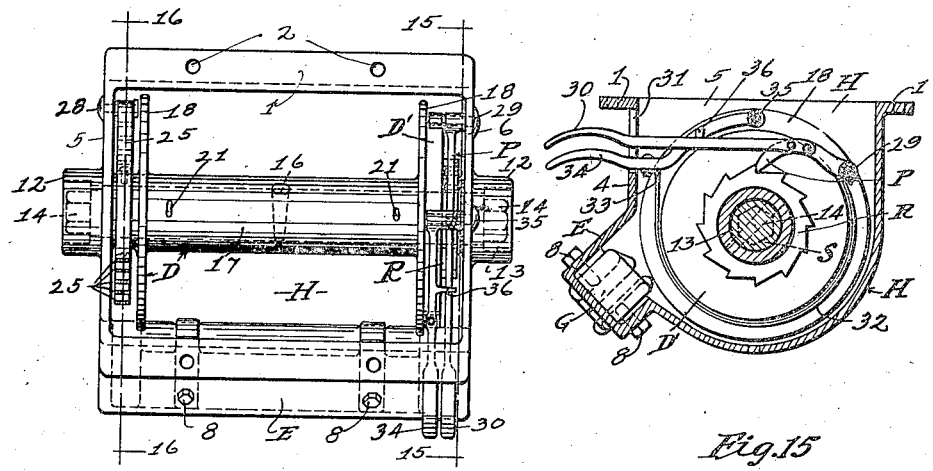
Fig. 14 is a plan view of a modified form of device, showing spring means for rewinding the same, and a brake and ratchet mechanism for regulating the operation of the winding means.
Fig. 15 is a sectional elevation of the same on line 15—15.

It will be understood that I do not limit myself to the exact form of construction shown in the several forms of device which I have illustrated in the drawings, and will describe clearly in the specification, for I conceive it possible to modify the form and element of my mechanism to suit varying conditions, within the scope of the appended claims, without departing from the spirit of my invention.

I will first describe the form of device shown in Figs. one to thirteen inclusive, which includes one or more housings H, adapted to be attached at suitable points to the body or frame of an automobile or motor vehicle A, in close proximity to the wheels W. said housing may have flanges 1 on the upper sides thereof, with holes 2, 2. etc., therein for receiving bolts 3, 3, etc., adapted to be attached in the form of device shown, preferably to the running board B of the vehicle, for holding the housing rigidly in position thereon.

The housings H are preferably of integral form, and the walls 4 thereof may be formed to suit convenience, as determined by the character of the mechanism within the housings. I prefer however, to make the wall 4 semi-circular in form, and connected by means of vertical portions with the flanges which are for inclosing ends 5 and 6. One side of the housing has an extension E which inclines downwardly in a plane substantially tangential to the periphery of the adjacent wheel W, and has a rectangular opening 7 in the outer end thereof for receiving a guide member G, which is held in the mouth of the housing, thus provided by means of one or more screws 8, 8.

This guide member G has a pair of circular passages 9, 9 near the ends thereof, which are spaced to conform to the spacing of the longitudinal members $C^1$ of the tire chain, and an elongated passage 10 is also provided between said circular passages, which is adapted to receive the cross members $C^2$ of the chain, and narrow slots 11, 11 are provided, and afford communication between the passages 9 and 10 and are adapted to receive the end links 15 of said cross chains. This construction is shown in Figs. 5, 6 and 7.

The ends 5 and 6 of the housing have bosses 12, 12 formed thereon, which provide bearings for a transverse shaft S, which is concentrically mounted in the housing relative to the curved wall 4, the outer portions of said bosses are recessed at 13 and the ends 14 of said shaft are hexagonical in form so as to receive a suitable wrench or crank T as shown in Fig. 8, by means of which said shaft may be turned. For this purpose the usual wheel nut wrench forming part of the equipment of a motor vehicle may be employed, thus eliminating the necessity of a special tool for attaching and detaching the chains from the tire. Within the housing H and attached to the shaft S by means of a pin 16, I provide a winding drum which has a central hub 17 and flanges 18—18 slightly spaced apart from the ends 5 and 6 of the housing.

A flat spring 19 is provided between each of the flanges 18 and the adjacent end of the housing, and has its ends seated in depressions 20 formed in the end of the housing, whereby the springs may be held within frictional engagement with the drum so as to prevent excessive speed thereof during the unwinding operation. The chain C which is of the usual character is adapted to be attached to and mounted around the hub 17 of drum D. The chains C are attached to the winding mechanism by means of an inner lead chain L which has its inner links attached to the hooks 21, 21 on the drum hub and the outer ends thereof have weighted links L¹ attached thereto, so that when the chain C is detached from the carrier and winding mechanism, the lead chains L of the device may be remounted on the drum and the links L¹, L¹, will overlap the edges of the passages 9—9 and prevent the outer ends of said lead chains from being drawn into the housing. As shown in Fig. 6 the outer end of the tire chain C has a similar lead chain L² attached thereto which is adapted to be preliminarily attached to the wheel W as shown in Fig. 2, at the beginning of an operation for placing the chain C on the wheel.

It will be readily apparent by reference to Figs. 2, 3, and 4 that when the lead chain L² is attached to the wheel W in the manner shown, and the car is moved forward, the chain C will be wrapped around the tires of the wheels until the ends of the chain are brought together, as shown in Fig. 3, and connected by means of the hooks C¹ in the usual manner, whereupon the lead chain L may be disconnected from the chain C, as shown in Fig. 4 and rewound upon the drum D within the housing H, by means of the crank T until the links L¹ thereof are brought into contact with the end of the guide G, as shown in Fig. 6. Thus the chains are quickly and easily placed in position on the wheels with a minimum of effort and in a minimum time, and the soiling of the hands and clothes is in most cases entirely eliminated.

When the chains are to be removed from the wheels, the lead chains L are withdrawn from the housing and attached to the ends of the chains C again, after the car is moved so as to release the chains from the wheels and the chain is drawn into the housing and wound upon the drum D by the use of the crank T.

Figure 16:
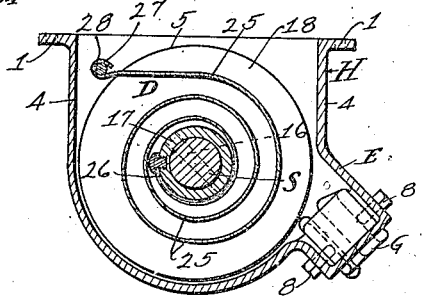
Fig. 16 is a sectional elevation of the same on line 16—16 of Fig. 14.

In the form of devices shown in Figs. 14, 15 and 16, I provide an automatic rewinding mechanism which includes a coil spring 25 attached at its inner end 26 to the hub 17 of drum D, and at its outer end 27 to a pin 28 in the end 5 of housing H, so that as the chain is released from the wheel, during the movement of the car the tension of said spring will cause the drum to rotate and rewind the chains thereon.

At the opposite end of said drum, adjacent the end 6 of the housing, I provide a ratchet R attached to the drum D or shaft S and adapted to be engaged by a pawl P pivoted to the end 6 of the housing on a pin 29, said pawl has a lever 30 attached to the central portion thereof and extended outwardly through a slot 31 in the wall 4 of the housing, so that the pawl may be manually released from the ratchet. The ratchet and pawl thus serve to hold the drum against rotation when the chain has been withdrawn to a selected extent, the drum being released for rotation by raising the outer end of the lever 30.

I also provide in the end of the housing, adjacent the wall 6 thereof, a brake band 32 adapted for frictional engagement with a narrow drum D' integrally formed with the drum D and on the end thereof adjacent the flange 18. One end of said brake band is stationarily held on the pin 29 which forms a fulcrum for the pawl P and the other end 33 is attached to the central portion of a manually operable lever 34 which is pivoted to the housing on a pin 35. The lever 34 projects through the slot 31 into the housing in a different plane from the lever 30 and is adapted to be raised for causing frictional contact between the band 32 and drum D'. A lug or pin 36 is provided on the lever 34 for engagement with the central portion of lever 30 so that it will be impossible to release the pawl P from ratchet R without simultaneously raising the lever 34 and thus applying the brake band 32 to the drum D'.

This automatic feature prevents an excessive speed of the drum D, due to the tension of the spring 25 when the pawl is released, either by carelessness or neglect to operate the two levers simultaneously.

I may provide means, as shown in Figs 9 and 11 for holding the drum D within the housing H, immovable when the chains are either withdrawn therefrom or inclosed therein. This purpose may be accomplished by the provision of a pin 40 adapted to be extended through one end of the shaft S and permanently held on the housing H by means of a chain 41 attached to a lug 42 on the housing.

I may provide also one or more drain outlets in the bottom of the housing for preventing the accumulation of water in the housing.

Figure 17:
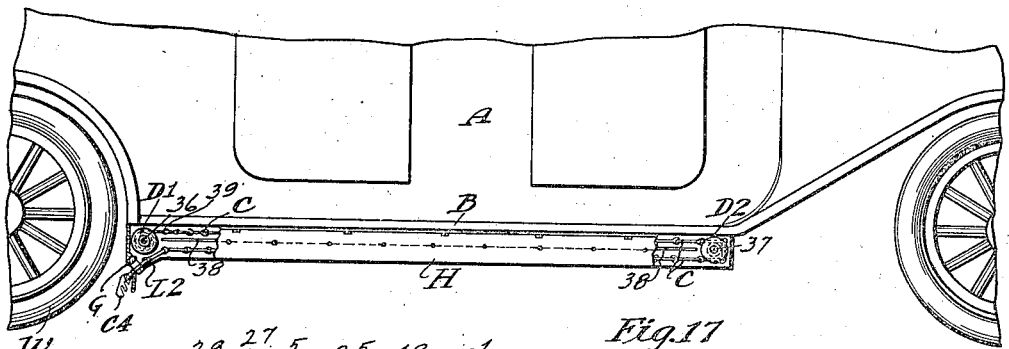
Fig. 17 is a side fragmentary elevation of an automobile showing another form of device embodying a carrier receptacle extending the full length of, and attached to, the lower side of the running board for housing the chains.

A third form of device for this same purpose is shown in Fig. 17 and includes an elongated housing H attached to the lower side of the running board B of the vehicle A. Drums D¹ and D² mounted on shafts 36 and 37 respectively, near the ends of said housing, and a horizontal partition 38 which subdivides the interior of the housing H into two separate compartments.

The drum D¹ has two inner lead chains 39 attached thereto at one end and the usual tire chain C at the other end thereof, said chain being extended forwardly of the automobile through the upper compartment, thence over the drum D² and thence rearwardly through the lower compartment to the rear end of the housing, where the lead chain L² is attached and adapted to draw the chain C inwardly and outwardly through the guide G at the rear end of the housing. The manner of attaching and detaching the chain from the wheel in this form of device is the same as in the other forms.

A particular feature of my device consists in the manner of attaching the inner lead chains L¹ to the hub 17 of the drums D. The hooks 21 which are attached to said hubs are arranged so that the lead chains will be disengaged therefrom in the event that the operator moves the car beyond the limits of the lead chains, thereby preventing damage to the device.

The outer lead chains L² are preferably provided with coil springs 44 intermediate the ends thereof, and suitable snap hooks, whereby they may be readily attached to the tire chains C and the springs provide a certain amount of resiliency to the connections between the tire chains and the wheels. The provision of the weighted links L¹ on the inner lead chains L makes the said chains always accessible for a chain detaching operation.

When the tire chains are wheeled in the housing on the drum D the outer lead chain L² is hooked to the last link of the tire chain and prevents the ends of said chains from being drawn into the box. It is carried in the housing in this position and is ready for the first step in another chain attaching operation. When the tire chains are in position on the wheels each outer lead chain is detached from the rim of the wheel and laid along and secured to the side members of the tire chains, or it may be removed entirely from the chains and attached to the outer ends of the inner lead chains and drawn to the entrance of the housing.

In the form of device shown in Fig. 17 it will be apparent that the tire chains are not mounted on the drums, but instead they are carried on a double shelf or platform under and extending the full length of the running board. The guide members G in this form of device are the same as those in other forms, as is also the outer lead chains. It will be apparent that in this form of device the chains 39 on drum D¹ will be extended through the upper compartment, over drum D² and thence through the lower compartment of the housing H, as the chain is withdrawn from the housing for use.

Now, briefly, describing the operation necessary for attaching a tire chain to a wheel, it is necessary first to remove the stop pin 40 which holds the shaft S in the carrier housing immovable. One end of the outer lead chain is then unhooked and extended around the rim of the wheel W, the ends being thereafter attached to the end link of the tire chain C, the car is then moved forward about one-and one-quarter revolutions of the wheel, whereupon the ends of the tire chain are attached together and the end link of the outer lead chain is attached to the tire chain in the manner shown in Fig. 4 so that it may not be displaced during the movement of the car. The tire chains now being attached to the wheels, the inner lead chains are detached therefrom and are wound on the drum D, after which the stop pin 40 is replaced so as to prevent further movement of the drum. This same operation is repeated for each of the four wheels of a vehicle.

When the chains are to be removed from the wheels they are first uncoupled and the car is then driven ahead until said chains are clear of the wheels. The stop pin 40 is then removed from the shaft S and the inner lead chains are withdrawn from the housing and attached to the inner end of the tire chain, after which the drum D is rotated for drawing the tire chains and the lead chains completely into the housing and the stop pin is replaced.

By the use of my device confusion and discomfort to passengers which results while a search for the chains under the seats and other places usually inaccesible is obviated and the chains are always in position for use on the car, and not subject to being left in the garage and inavailable for use when they are most needed. Furthermore, when the chains are carried in the old way in a bag or other like receptacle, it is first necessary to straighten the chains out before they can be placed on the wheels, this is not necessary in my device, as the chains are at all times supported in such a manner that the links thereof may not become entangled with each other. Furthermore, the chains are supported on the vehicle in alinement with the wheels.

Many other benefits will be immediately recognized by those familiar with the use of tire chains, all of which will be obvious from the consideration of my device, hereinbefore described.

What I claim is:

1. A tire chain carrier including a housing adapted to rotatably hold a drum, a guide member held in the entrance to said housing, and having communication passages for receiving the longitudinal and transverse members of a tire chain, said chain adapted to be mounted on said drum for the purpose described.

2. In a tire chain carrier of the character described, a guide member for the chain having spaced parallel entrance passages for receiving and holding the longitudinal chain members, a central passage for receiving the connnection links of the transverse chain members, and restricted passages communicating with said other passages for receiving the end links of said transverse chain members.

3. A tire chain carrier including a housing having an opening in one side thereof, a guide member detachably held in said opening for receiving and guiding a chain adapted to be moved therethrough, said housing being adapted to receive a drum, for holding a tire chain preparatory to application to a wheel for use.

4. A tire chain carrier including a guide member for the chain having spaced restricted openings for receiving portions of the chain, and alternating openings of larger size between and on opposite sides of said restricted openings for the purpose described.

5. A tire chain carrier comprising a housing arranged for extensibly holding a tire chain and provided with an elongated opening, a slotted guide member detachably held therein, and means within said housing for moving a tire chain through said guide member, for the purpose described.

6. A tire chain carrier comprising a housing having an entrance through which a chain is adapted to be moved, a drum rotatably held in said housing for holding said chain, and means supported on said housing for frictional engagement with and for preventing excessive speed of said drum, as described.

7. A device of the character described comprising a housing having an extension thereon, a guide member held in said extension, transversely spaced openings through said guide member, a central opening also through said guide member, and relatively narrow openings affording communication between said central opening and said spaced openings for the purpose described, said housing being arranged for receiving and holding a tire chain whereby said chain may be fed through the openings in said guide member.

JOHN P. HART.

Witnesses:
J. W. SHEELEY,
IRENE BREEN.